(12) United States Patent
Woo et al.

(10) Patent No.: US 11,384,225 B2
(45) Date of Patent: Jul. 12, 2022

(54) TPO SHEET ALLOWING DISPLAY AND TOUCH SENSING

(71) Applicant: LG HAUSYS, LTD., Seoul (KR)

(72) Inventors: Jae Hun Woo, Seoul (KR); Yong Bae Jung, Seoul (KR); Yun Ho Lee, Seoul (KR)

(73) Assignee: LG Hausys, Ltd., Seoul (KR)

( * ) Notice: Subject to any disclaimer, the term of this patent is extended or adjusted under 35 U.S.C. 154(b) by 138 days.

(21) Appl. No.: 16/605,724

(22) PCT Filed: Jul. 6, 2018

(86) PCT No.: PCT/KR2018/007700
§ 371 (c)(1),
(2) Date: Oct. 16, 2019

(87) PCT Pub. No.: WO2020/009258
PCT Pub. Date: Jan. 9, 2020

(65) Prior Publication Data
US 2021/0230408 A1    Jul. 29, 2021

(51) Int. Cl.
*C08L 23/02* (2006.01)
*C08J 5/18* (2006.01)

(52) U.S. Cl.
CPC .............. *C08L 23/02* (2013.01); *C08J 5/18* (2013.01); *C08J 2323/06* (2013.01); *C08J 2323/12* (2013.01); *C08J 2423/08* (2013.01); *C08L 2205/025* (2013.01); *C08L 2205/035* (2013.01)

(58) Field of Classification Search
CPC ........... C08L 2205/03; C08L 2205/035; C08L 2201/10; C08L 2666/72
See application file for complete search history.

(56) References Cited

U.S. PATENT DOCUMENTS

2010/0125118 A1* 5/2010 Brant ...................... C08L 23/12
524/423

FOREIGN PATENT DOCUMENTS

| KR | 10-2003-0041499 A | 5/2003 |
| KR | 10-2003-0092575 A | 12/2003 |
| KR | 10-2010-0044443 A | 4/2010 |
| KR | 10-2011-0020039 A | 3/2011 |
| KR | 10-2014-0061248 A | 5/2014 |
| KR | 10-2017-0133078 A | 12/2017 |
| KR | 10-2018-0059974 A | 6/2018 |
| KR | 10-2018-0085649 A | 7/2018 |

* cited by examiner

*Primary Examiner* — Ana L. Woodward
(74) *Attorney, Agent, or Firm* — Dentons US LLP

(57) ABSTRACT

The present invention relates to a TPO sheet allowing display and touch sensing. More specifically, the present invention relates to a TPO sheet having a color and light-transmitting properties used as surface materials for automobile interior parts. According to the present invention, when the TPO sheet is used as surface materials for automobile interior parts, an interior decorative effect may be obtained due to color properties thereof. In addition, when the TPO sheet is attached to the surface of a display panel, due to light-transmitting properties thereof, light emitted from the display panel may be transmitted through the TPO sheet. Thus, content displayed on the display panel may be visible through the TPO sheet. In addition, a touch sensing operation may be performed on the TPO sheet.

8 Claims, No Drawings

TPO SHEET ALLOWING DISPLAY AND TOUCH SENSING

This application is a National Stage Entry of International Application No. PCT/KR2018/007700, filed Jul. 6, 2018, which is hereby incorporated by reference in its entirety for all purposes as if fully set forth herein.

TECHNICAL FIELD

The present invention relates to a TPO sheet allowing display and touch sensing. More specifically, the present invention relates to a TPO sheet having a color and light-transmitting properties used as surface materials for automobile interior parts. According to the present invention, when the TPO sheet is used as surface materials for automobile interior parts, an interior decorative effect may be obtained due to color properties thereof. In addition, when the TPO sheet is attached to the surface of a display panel, due to light-transmitting properties thereof, light emitted from the display panel may be transmitted through the TPO sheet. Thus, content displayed on the display panel may be visible through the TPO sheet. In addition, a touch sensing operation may be performed on the TPO sheet.

BACKGROUND ART

Conventionally, PVC extrusion sheets, PVC/ABS alloy extrusion sheets, and calendering sheets have been widely used as surface materials for automobile interior parts, e.g., instrument panels, door trim panels, and head linings. In recent years, the use of thermoplastic polyolefin (hereinafter referred to as "TPO") sheets, which are advantageous in terms of environmental friendliness, lightweight, odor, and the like, has been rapidly increasing.

In addition, to realize an aesthetically pleasing interior, surface materials for automobile interior parts manufactured by applying lighting technology have been proposed.

For example, in Korean Patent Application Publication No. 10-2010-0044443, a method of installing illuminants in garnishes is disclosed. According to the conventional method, a luxurious automobile interior atmosphere may be realized with light emitted from the illuminants installed in the garnishes.

Accordingly, the conventional method may realize a lighting effect. However, hard plastic parts that make up a garnish may give a user a cold feeling.

That is, the components of the garnish according to the conventional method cannot give a user a soft and warm feeling. Accordingly, the conventional method has difficulty in realizing good aesthetics.

RELATED ART DOCUMENTS

Patent Documents (Patent Document 1) KR 10-2010-0044443 A (Apr. 30, 2010)

DISCLOSURE

Technical Problem

Therefore, the present invention has been made in view of the above problems, and it is one object of the present invention to provide a TPO sheet having a color and light-transmitting properties used as surface materials for automobile interior parts. According to the present invention, when the TPO sheet is used as surface materials for automobile interior parts, an interior decorative effect may be obtained due to color properties thereof. In addition, when the TPO sheet is attached to the surface of a display panel, due to light-transmitting properties thereof, light emitted from the display panel may be transmitted through the TPO sheet. Thus, content displayed on the display panel may be visible through the TPO sheet. In addition, a touch sensing operation may be performed on the TPO sheet.

Technical Solution

In accordance with one aspect of the present invention, provided is a TPO sheet including 0.06 to 3 by weight of a pigment, wherein the TPO sheet has a transmittance of 2 to 20%.

Advantageous Effects

Since the TPO sheet of the present invention has a color, an interior decorative effect can be realized.

Since the TPO sheet of the present invention has light-transmitting properties, light emitted from a display panel can be transmitted to the outside through the TPO sheet. Thus, when the TPO sheet is attached to the surface of the TPO sheet, the content displayed on the display panel can be visible through the TPO sheet.

When the TPO sheet of the present invention is attached to the surface of a display panel, a touch sensing operation can be performed on the TPO sheet.

BEST MODE

Hereinafter, the present invention will be described in detail.

The present invention relates to a TPO sheet including 0.06 to 3% by weight of pigment and having a transmittance of 2 to 20%.

The TPO sheet may be formed using a TPO composite resin A alone or using 75 to 95 parts by weight of the TPO composite resin A and 10 to 30 parts by weight of a polyolefin resin B.

In the present invention, the TPO composite resin A may be a composite resin prepared by dispersing rubber-phase particles a2 in a thermoplastic polyolefin-based matrix resin a1.

The thermoplastic polyolefin-based matrix resin a1 may include one or more selected from polypropylene and polyethylene. Preferably, the thermoplastic polyolefin-based matrix resin a1 includes both polypropylene and polyethylene.

Homo-polypropylene having low odor and little change by temperature or light is preferably used as the polypropylene, but the present invention is not limited thereto.

Low-density polyethylene having low hardness and excellent moldability is preferably used as the polyethylene, but the present invention is not limited thereto.

A sum of contents of polypropylene and polyethylene included in the TPO composite resin A may be 6 to 25% by weight. Preferably, polypropylene is included in an amount of 5 to 20% by weight and polyethylene is included in an amount of 1 to 5% by weight.

When the content of the polypropylene is less than the above range, shape maintenance may be poor when vacuum forming is performed using the TPO sheet. When the content of the polypropylene exceeds the above range, the workability of the composite resin A may be poor, making it difficult to prepare the TPO sheet using the composite resin A. Thus, the polypropylene is preferably included in an amount within the above range.

When the content of the polyethylene is less than the above range, moldability may be poor. When the content of the polyethylene exceeds the above range, the physical properties of the TPO sheet may be degraded. Thus, the polyethylene is preferably included in an amount within the above range.

Specifically, the rubber-phase particles a2 may include one or more selected from ethylene-propylene rubber, ethylene-propylene-diene rubber, ethylene-octene rubber, ethylene-butene rubber, ethylene-butadiene rubber, and styrene-ethylene-butadiene-styrene rubber, and may be included in an amount of 20 to 40% by weight in the TPO composite resin A.

In addition, the TPO composite resin A may further include a filler a3.

The filler a3 may include one or more selected from carbon black, precipitated calcium carbonate, ground calcium carbonate, clay, talc, and silica, and may be included in an amount of 20 to 40% by weight in the TPO composite resin A. When the content of the filler is less than the above range, it is difficult to obtain sufficient strength. When the content of the filler exceeds the above range, elasticity may be reduced. Thus, the filler is preferably included in an amount within the above range.

In addition, the TPO composite resin A may further include additives a4 such as cross-linking agents, flame retardants, and anti-aging agents.

The TPO composite resin A may have a melt flow rate (MFR) of 10 to 30 g/10 min (under conditions of 230° C. and 10 kg), preferably 15 to 25 g/10 min (under conditions of 230° C. and 10 kg). When the MFR of the TPO composite resin A is less than the above range, flowability may be too low, resulting in poor workability. When the MFR of the TPO composite resin A exceeds the above range, the flowability of the TPO composite resin A is too high, lowering melt strength. Thus, the TPO composite resin A is preferably prepared to have a melt flow rate within the above range.

In addition, the TPO composite resin A may have a Shore A hardness of 80 to 95, preferably 85 to 90. When the Shore A hardness of the TPO composite resin A is less than the above range, tearing may occur, and scratch resistance may be degraded. When the Shore A hardness of the TPO composite resin A exceeds the above range, impact strength may be reduced. In the present invention, when the TPO sheet includes the TPO composite resin A and the polyolefin resin B, the TPO composite resin A may be included in an amount of 75 to 95 parts by weight, preferably 80 to 90 parts by weight. When the content of the TPO composite resin A is less than the above range, the TPO sheet may be susceptible to bursting or tearing, embossing may be difficult, and the TPO composite resin A may lack performance as an elastomer. Thus, the TPO composite resin A is preferably included in an amount within the above range.

Conventional polyolefin-based resins used for interior and exterior materials for automobiles may be used as the polyolefin resin B without a particular limitation. Specifically, polyethylene resins and polypropylene resins may be used as the polyolefin resin B. These polyolefins may take the form of polymers, oligomeric polymers, or elastomeric rubber, and mixtures obtained through a combination of these forms may be used as the polyolefins.

In the present invention, as the polyolefin resin B, a linear low-density polyethylene prepared by copolymerizing ethylene and one or more comonomers selected from butylene, hexene, and octene is preferably used. Since the molecular weight distribution of the linear low-density polyethylene is narrower than that of low-density polyethylene (LDPE) resin, the linear low-density polyethylene has no long side chain and has only short side chains. Thus, in terms of molecular structure, the linear low-density polyethylene has higher crystallinity and higher melting point than the low-density polyethylene resin. Accordingly, the linear low-density polyethylene is advantageous in terms of melting temperature range and may provide a wide range of pre-heating temperatures during molding. In addition, the linear low-density polyethylene has excellent rigidity or stress cracking resistance, high tear resistance, and relatively high surface hardness. Therefore, when the linear low-density polyethylene is used, a sheet having excellent gloss may be prepared.

In addition, the polyolefin resin B may have a melt flow rate (MFR) of 0.5 to 5 g/10 min (under conditions of 190° C. and 2.16 kg), preferably 0.8 to 2 g/10 min (under conditions of 190° C. and 2.16 kg). When the MFR of the polyolefin resin B is less than the above range, flowability may be too low, resulting in poor workability. When the MFR of the polyolefin resin B exceeds the above range, workability may be lowered. Thus, the polyolefin resin B is preferably prepared to have a melt flow rate within the above range.

The polyolefin resin B may be included in an amount of 10 to 30 parts by weight, preferably 15 to 25 parts by weight. When the content of the polyolefin resin B is less than the above range, an elongation rate may be lowered.

When the content of the polyolefin resin B exceeds the above range, a whitening phenomenon may occur when molding is performed using the TPO sheet. Thus, the polyolefin resin B is preferably included in an amount within the above range.

The TPO sheet of the present invention includes 0.06 to 3% by weight of pigment.

Specifically, regardless of the kind of pigments, any pigments may be used as the pigment of the present invention within the above range. For the color realization and light-transmitting properties, the content range of a pigment used may vary depending on the color of the pigment.

For example, black pigments are preferably included in an amount of 0.06 to 0.2% by weight so as to realize the color of the TPO sheet while allowing the TPO sheet to have light-transmitting properties. Beige pigments are preferably included in an amount of greater than 0.4% by weight and 1.0% by weight or less, and red pigments are preferably included in an amount of 0.3 to 1.0% by weight.

When the content of a pigment included in the TPO sheet is less than the above range, implementation of the color of the TPO sheet may be difficult, and the concealment force of the TPO sheet may be poor. As a result, an underlying structure may be exposed. On the other hand, when the content of a pigment included in the TPO sheet exceeds the above range, the implementation of the color of the TPO sheet may be easy, and the concealment force of the TPO sheet may be excellent. However, the light-transmitting properties of the TPO sheet may be degraded. As a result, implementation of a display may be difficult. Thus, the pigment is preferably included in an amount within the above range.

When the TPO sheet of the present invention includes the TPO composite resin A and the polyolefin resin B, the TPO sheet may further include a polyolefin-based elastomer C to enhance impact resistance.

The polyolefin-based elastomer C may include one or more selected from ethylene-propylene rubber, ethylene-propylene-diene rubber, ethylene-butene rubber, and ethylene-octene rubber.

In particular, the grade of ethylene-octene rubber is determined depending on octene content. In the present invention, ethylene-octene rubber containing octene in an amount of 40 to 50% by weight, more preferably 40 to 45% by weight, based on the total weight of the ethylene-octene rubber is preferably used. When the content of octene is less than the above range, moldability may be degraded. When the content of octene exceeds the above range, the soft texture of a final product may be improved, but calendering workability may be poor. Thus, ethylene-octene rubber containing octene in an amount within the above range is preferably used.

The ethylene-octene rubber may have a melt flow rate (MFR) of 1 to 5 g/10 min (under conditions of 190° C. and 2.16 kg), preferably 3 to 4 g/10 min (under conditions of 190° C. and 2.16 kg). When the MFR of the ethylene-octene rubber is less than the above range, moldability may be poor. When the MFR of the ethylene-octene rubber exceeds the above range, physical properties may be degraded. Thus, the ethylene-octene rubber is preferably prepared to have a melt flow rate within the above range.

The polyolefin-based elastomer C may be included in an amount of 10 to 30 parts by weight, preferably 15 to 25 parts by weight. When the content of the polyolefin-based elastomer C is less than the above range, the rigidity enhancement effect may be insignificant. When the content of the polyolefin-based elastomer C exceeds the above range, the degree of sagging may be severe and wrinkles may occur during molding. Thus, the polyolefin-based elastomer C is preferably included in an amount within the above range.

When necessary, the TPO sheet of the present invention may further include conventionally known additives to adjust the physical properties thereof. For example, the TPO sheet may further include one or more additives selected from the group consisting of plasticizers, inorganic fillers, light stabilizers, heat stabilizers, antioxidants, lubricants, flame retardants, antimicrobial agents, and anti-hydrolysis agents.

The content of the additives may be determined within a range that does not affect the physical properties of sheets used in surface materials for automobile interior parts.

When the TPO sheet of the present invention is prepared, T-die extrusion molding, calendering molding, or blow molding may be used.

T-die extrusion molding is a molding method in which a thermoplastic plastic material is heated and melted using an extruder so that the state of the thermoplastic plastic material is changed into a fluid state, and then the thermoplastic plastic material in a fluid state is extruded in the form of a sheet using a T-die and at the same time, the thermoplastic plastic material in the form of a sheet is continuously pressed onto the surface of a substrate. Blow molding is a molding method in which a thermoplastic resin is heated and melted, is continuously extruded in the form of a tube using an extruder, and then sheets are manufactured using the extruded resin. Calendering molding is a molding method in which sheets are continuously manufactured by rolling a raw material between two or more rolls rotating in opposite directions to each other.

Preferably, calendering molding having excellent productivity is used.

The TPO sheet of the present invention may have a thickness of 0.1 to 2 mm, preferably 0.3 to 1.4 mm. When the thickness of the TPO sheet is less than the above range, the texture of the TPO sheet may be poor. When the thickness of the TPO sheet exceeds the above range, the light-transmitting properties of the TPO sheet may be degraded, thereby making the implementation of display and operation of touch sensing difficult. Thus, the TPO sheet is preferably manufactured to have a thickness within the above range.

The TPO sheet of the present invention may have a transmittance of 2 to 20%, 2 to 16%, or 4 to 19%. When the transmittance of the TPO sheet is less than the above range, the implementation of the color of the TPO sheet may be easy, and the concealment force of the TPO sheet may be excellent. However, the light-transmitting properties of the TPO sheet may be degraded. As a result, implementation of display may be difficult. On the other hand, when the transmittance of the TPO sheet exceeds the above range, implementation of the color of the TPO sheet may be difficult, and the concealment force of the TPO sheet may be poor. As a result, an underlying structure may be exposed. Thus, the TPO sheet is preferably manufactured to have a transmittance within the above range.

Since the TPO sheet of the present invention has a color, an interior decorative effect may be realized.

Since the TPO sheet of the present invention has light-transmitting properties, light emitted from a display panel may be transmitted to the outside through the TPO sheet. Thus, when the TPO sheet is attached to the surface of the TPO sheet, content displayed on the display panel may be visible through the TPO sheet.

When the TPO sheet of the present invention is attached to the surface of a display panel, a touch sensing operation may be performed on the TPO sheet.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLE

1. Preparation of Resin Composition for TPO Sheet

A resin composition for TPO sheets according to an Example of the present invention was prepared using the composition shown in Table 1 below.

TABLE 1

| Components | Example (parts by weight) |
| --- | --- |
| TPO composite resin A | 84 |
| Polyolefin resin B | 18 |
| Polyolefin-based elastomer C | 18 |
| Heat stabilizer | 1.1 |

In this Example, the TPO composite resin A having a melt flow rate (MFR) of 20 g/10 min (under conditions of 230° C. and 10 kg), and a thermoplastic polyolefin elastomer having a Shore A hardness of 88 was used. In addition, as the polyolefin resin B, a linear low-density polyethylene having a melt flow rate (MFR) of 0.5 to 5 g/10 min (under conditions of 190° C. and 2.16 kg) was used.

In this Example, as the polyolefin-based elastomer C, ethylene octene rubber (EOR) having a melt flow rate (MFR) of 1 to 5 g/10 min (under conditions of 190° C. and 2.16 kg) was used.

2. Manufacture of TPO Sheet (Examples) Pigments were added to the resin composition for TPO sheets according to Table 1 in the amounts shown in Table 2 below, and mixing was performed. Then, melting was performed at a temperature of 160 to 230° C., and the molten melt was passed between calender rolls having a surface temperature of about 170° C. to obtain TPO sheets having a thickness of 0.6 mm.

In this case, beige, red, and black pigments were used.

(Comparative Examples) Pigments were added to the resin composition for TPO sheets according to Table 1 in the amounts shown in Table 3 below. Then, TPO sheets having a thickness of 0.6 mm were manufactured through the same procedure as above.

In this case, beige, red, and black pigments were used.

TABLE 2

| | Beige (% by weight) | Red (% by weight) | Black (% by weight) |
|---|---|---|---|
| Example 1 | | | 0.06 |
| Example 2 | | | 0.08 |
| Example 3 | | | 0.1 |
| Example 4 | | | 0.2 |
| Example 5 | 0.5 | | |
| Example 6 | 0.6 | | |
| Example 7 | 0.7 | | |
| Example 8 | 1.0 | | |
| Example 9 | | 0.3 | |
| Example 10 | | 0.4 | |
| Example 11 | | 0.5 | |
| Example 12 | | 0.6 | |
| Example 13 | | 1.0 | |

TABLE 3

| | Beige (% by weight) | Red (% by weight) | Black (% by weight) |
|---|---|---|---|
| Comparative Example 1 | | | 0.02 |
| Comparative Example 2 | | | 0.04 |
| Comparative Example 3 | | | 0.3 |
| Comparative Example 4 | | | 0.4 |
| Comparative Example 5 | | | 0.5 |
| Comparative Example 6 | | | 1.0 |
| Comparative Example 7 | | | 1.5 |
| Comparative Example 8 | | | 2 |
| Comparative Example 9 | | | 2.5 |
| Comparative Example 10 | 0.3 | | |
| Comparative Example 11 | 0.4 | | |
| Comparative Example 12 | 1.5 | | |
| Comparative Example 13 | 2.0 | | |
| Comparative Example 14 | 2.5 | | |
| Comparative Example 15 | | 0.2 | |
| Comparative Example 16 | | 1.5 | |
| Comparative Example 17 | | 2.0 | |
| Comparative Example 18 | | 2.5 | |

Experimental Example 1

Measurement of Transmittance of TPO Sheet

The transmittance of the TPO sheets according to Examples or Comparative Examples depending on the concentration of the pigments was measured, and the results are shown in Tables 4 and 5 below.

Transmittance was measured using a Haze-Gard II (Toyoseiki co.) using a CIE-A standard light source (halogen lamp) defined by International Commission on Illumination according to ASTM D 1003.

TABLE 4

| | Beige (% by weight) | Red (% by weight) | Black (% by weight) | Transmittance (%) |
|---|---|---|---|---|
| Example 1 | | | 0.06 | 20.00 |
| Example 2 | | | 0.08 | 14.50 |
| Example 3 | | | 0.1 | 11.50 |
| Example 4 | | | 0.2 | 2.80 |
| Example 5 | 0.5 | | | 13.00 |
| Example 6 | 0.6 | | | 10.50 |
| Example 7 | 0.7 | | | 8.50 |
| Example 8 | 1.0 | | | 2.50 |
| Example 9 | | 0.3 | | 20.00 |
| Example 10 | | 0.4 | | 13.00 |
| Example 11 | | 0.5 | | 10.00 |
| Example 12 | | 0.6 | | 7.00 |
| Example 13 | | 1.0 | | 2.20 |

TABLE 5

| | Beige (% by weight) | Red (% by weight) | Black (% by weight) | Transmittance (%) |
|---|---|---|---|---|
| Comparative Example 1 | | | 0.02 | 35.00 |
| Comparative Example 2 | | | 0.04 | 27.00 |
| Comparative Example 3 | | | 0.3 | 0.50 |
| Comparative Example 4 | | | 0.4 | 0.10 |
| Comparative Example 5 | | | 0.5 | 0.30 |
| Comparative Example 6 | | | 1.0 | 0.00 |
| Comparative Example 7 | | | 1.5 | 0.00 |
| Comparative Example 8 | | | 2 | 0.00 |
| Comparative Example 9 | | | 2.5 | 0.00 |
| Comparative Example 10 | 0.3 | | | 26.00 |

TABLE 5-continued

|  | Beige (% by weight) | Red (% by weight) | Black (% by weight) | Transmittance (%) |
|---|---|---|---|---|
| Comparative Example 11 | 0.4 | | | 21.00 |
| Comparative Example 12 | 1.5 | | | 0.70 |
| Comparative Example 13 | 2.0 | | | 0.15 |
| Comparative Example 14 | 2.5 | | | 0.05 |
| Comparative Example 15 | | 0.2 | | 28.00 |
| Comparative Example 16 | | 1.5 | | 0.60 |
| Comparative Example 17 | | 2.0 | | 0.20 |
| Comparative Example 18 | | 2.5 | | 0.10 |

As shown in Tables 4 and 5, it can be confirmed that transmittance is inversely proportional to the concentration of pigments. More specifically, as shown in Table 4, when the beige pigment is included in an amount of 0.5 to 1% by weight, the red pigment is included in an amount of 0.3 to 1% by weight, or the black pigment is included in an amount of 0.06 to 0.2% by weight, transmittance is 2 to 20%. In this case, color may be implemented, and light-transmitting properties may be obtained.

As shown in Table 5, when the content of the pigments is less than the above range, the transmittance may be excessively increased. Accordingly, implementation of the color of the TPO sheet may be difficult, and the concealment force of the TPO sheet may be poor. As a result, an underlying structure may be exposed. When the content of the pigments exceeds the above range, the implementation of the color of the TPO sheet may be easy, and the concealment force of the TPO sheet may be excellent. However, the transmittance of the TPO sheet may be significantly reduced. As a result, implementation of display may be difficult.

Experimental Example 2

Determining Whether Touch Sensing Operation Can Be Performed on a TPO Sheet

Example 3

Components according to the composition of Example 3 were mixed, melted at a temperature of 160 to 230° C., and the molten melt was passed between calender rolls having a surface temperature of about 170° C. to obtain a TPO sheet having a thickness of 0.6 mm.

Comparative Example 19

A TPO sheet having a thickness of 2.5 mm was manufactured using the same composition and the same procedure as in Example 3.

The TPO sheet manufactured according to Example 3 or Comparative Example 19 was attached to the surface of a display panel. Then, whether a touch sensing operation can be performed on the sheet was determined, and the results are shown in Table 6 below.

TABLE 6

|  | Example 3 | Comparative Example 19 |
|---|---|---|
| Thickness (mm) | 0.6 | 2.5 |
| Touch sensing | Possible | Not possible |

As shown in Table 6, the thickness of the TPO sheet of Comparative Example 19 is much thicker than that of the TPO sheet of Example 3. Accordingly, when the TPO sheet of Comparative Example 19 was attached to the surface of a display panel, a touch sensing operation was not possible.

The invention claimed is:

1. A thermoplastic polyolefin (TPO) sheet, comprising:
   0.06 to 3% by weight of a pigment based on a total weight of the TPO sheet,
   wherein the TPO sheet has a transmittance of 2 to 20%, wherein the transmittance is measured according to ASTM D 1003,
   wherein the TPO sheet comprises 80 to 90 parts by weight of a TPO composite resin A, 15 to 25 parts by weight of a polyolefin resin B, and 15 to 25 parts by weight of a polyolefin-based elastomer C,
   wherein the TPO composite resin A comprises a composite resin prepared by dispersing rubber-phase particles a2 in a thermoplastic polyolefin-based matrix resin a1,
   wherein the thermoplastic polyolefin-based matrix resin a1 is included in an amount of 6 to 25% by weight and the rubber-phase particles a2 is included in an amount of 20 to 40% by weight, based on the total weight of the TPO composite resin A,
   wherein the thermoplastic polyolefin-based matrix resin a1 comprises 5 to 20% by weight of polypropylene and 1 to 5% by weight of polyethylene, based on the total weight of the TPO composite resin A,
   wherein the rubber-phase particles a2 comprise one or more selected from the group consisting of ethylene-propylene rubber, ethylene-propylene-diene rubber, ethylene-butene rubber, ethylene-butadiene rubber, and styrene-ethylene-butadiene-styrene rubber,
   wherein the polyolefin resin B is linear low-density polyethylene prepared by copolymerizing ethylene and one or more comonomers selected from butylene, and hexene,
   wherein the polyolefin-based elastomer C is ethylene-octene rubber, and
   wherein the TPO sheet has a thickness of 0.1 to 2 mm.

2. The TPO sheet according to claim 1, wherein the polypropylene included in the thermoplastic polyolefin-based matrix resin a1 is homo-polypropylene and the polyethylene included in the thermoplastic polyolefin-based matrix resin a1 is low-density polyethylene.

3. The TPO sheet according to claim 1, wherein the TPO composite resin A further comprises one or more fillers a3 selected from the group consisting of precipitated calcium carbonate, ground calcium carbonate, clay, talc, and silica.

4. The TPO sheet according to claim 3, wherein the fillers a3 are comprised in an amount of 20 to 40% by weight in the TPO composite resin A.

5. The TPO sheet according to claim 1, wherein the TPO composite resin A has a melt flow rate (MFR) of 10 to 30 g/10 min (under conditions of 230° C. and 10 kg).

6. The TPO sheet according to claim 1, wherein the TPO composite resin A has a Shore A hardness of 80 to 95.

7. The TPO sheet according to claim 1, wherein the polyolefin resin B has a melt flow rate (MFR) of 0.5 to 5 g/10 min (under conditions of 190° C. and 2.16 kg).

8. The TPO sheet according to claim 1, wherein the ethylene-octene rubber has a melt flow rate (MFR) of 1 to 5 g/10 min (under conditions of 190° C. and 2.16 kg).

* * * * *